Aug. 30, 1966 W. A. KELLY ETAL 3,268,970
APPARATUS FOR MAKING MULTICOLORED SOAP BARS
Filed Nov. 27, 1964 6 Sheets-Sheet 1

INVENTORS:
WILLIAM A. KELLY
PHILIP J. PETIX
BY
THEIR ATTORNEYS

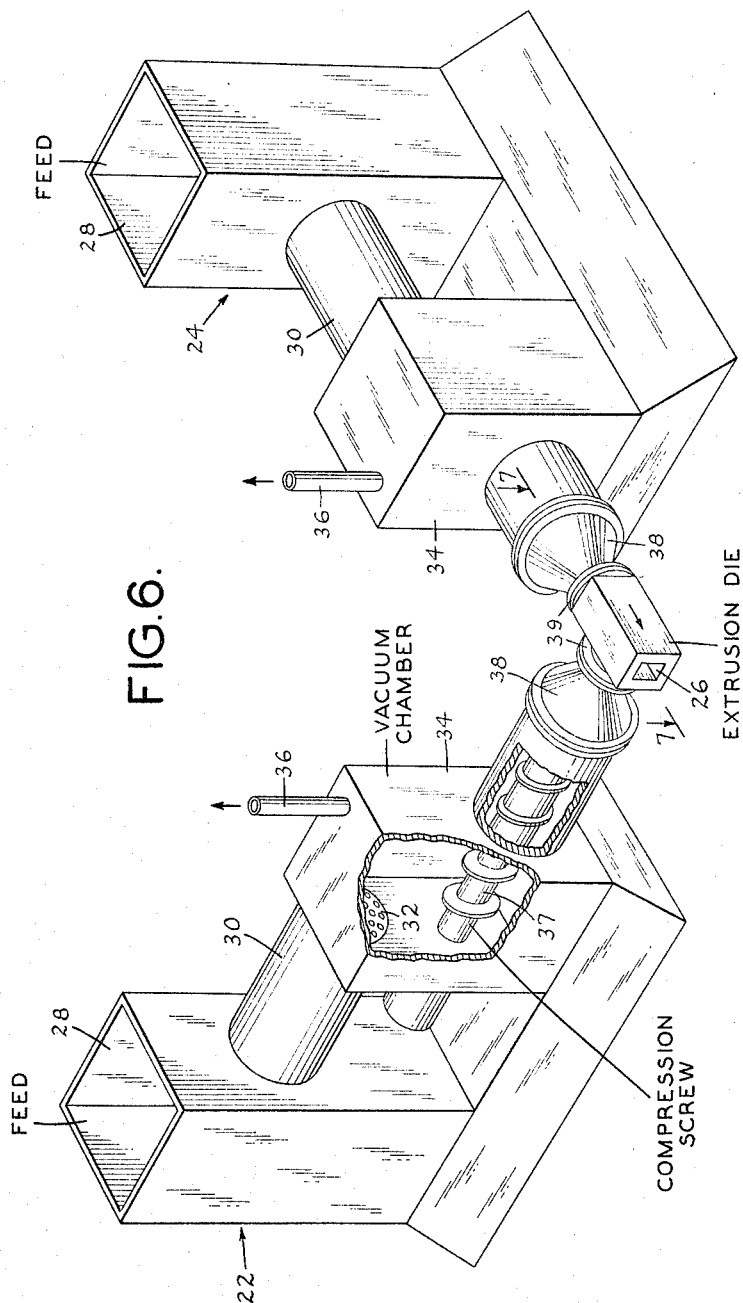

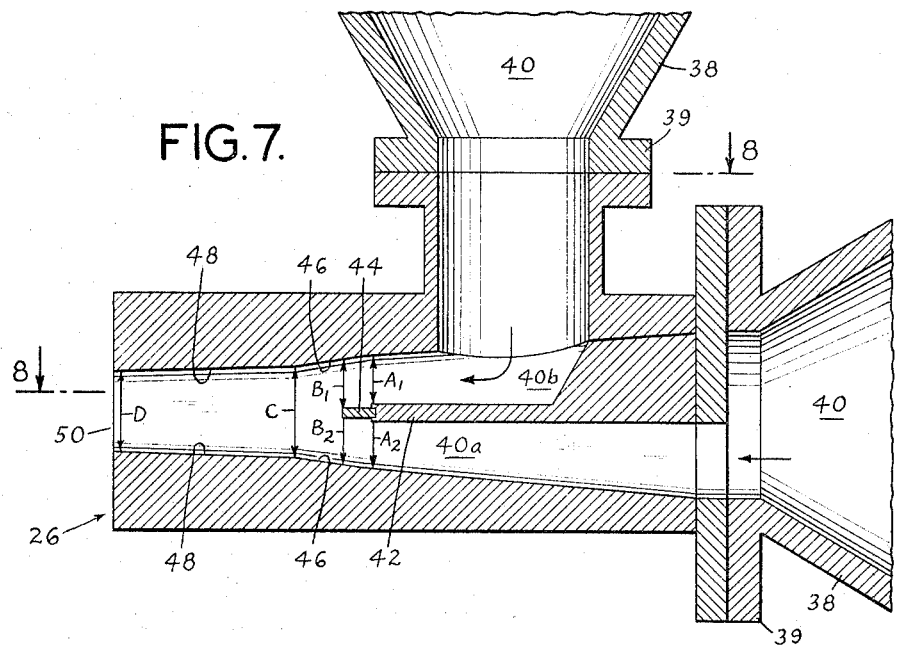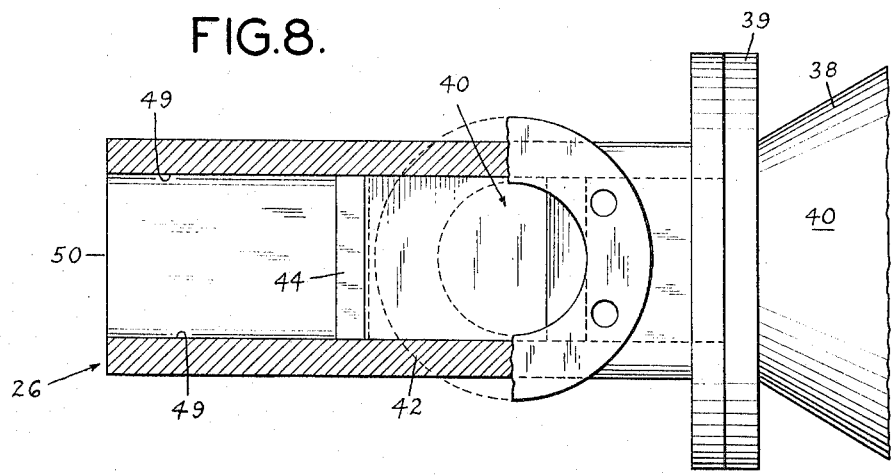

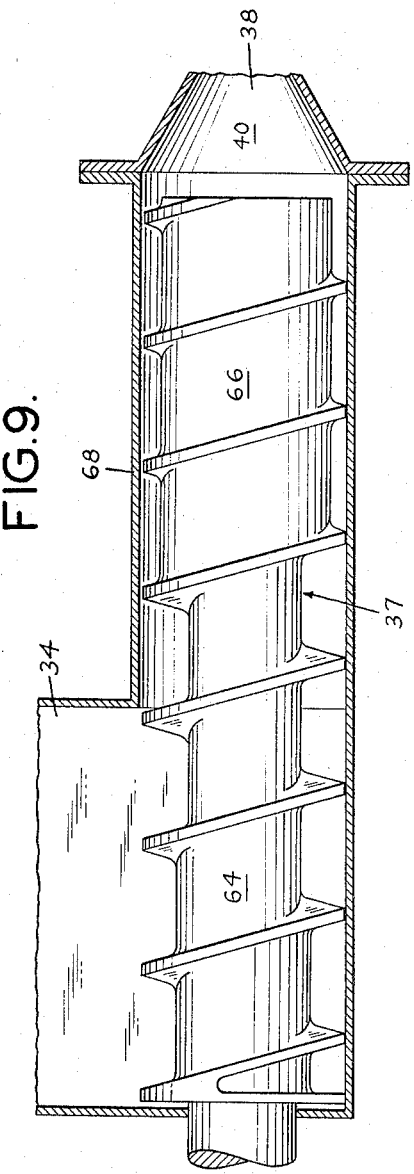
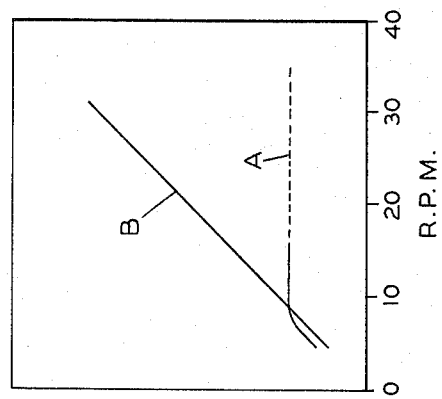

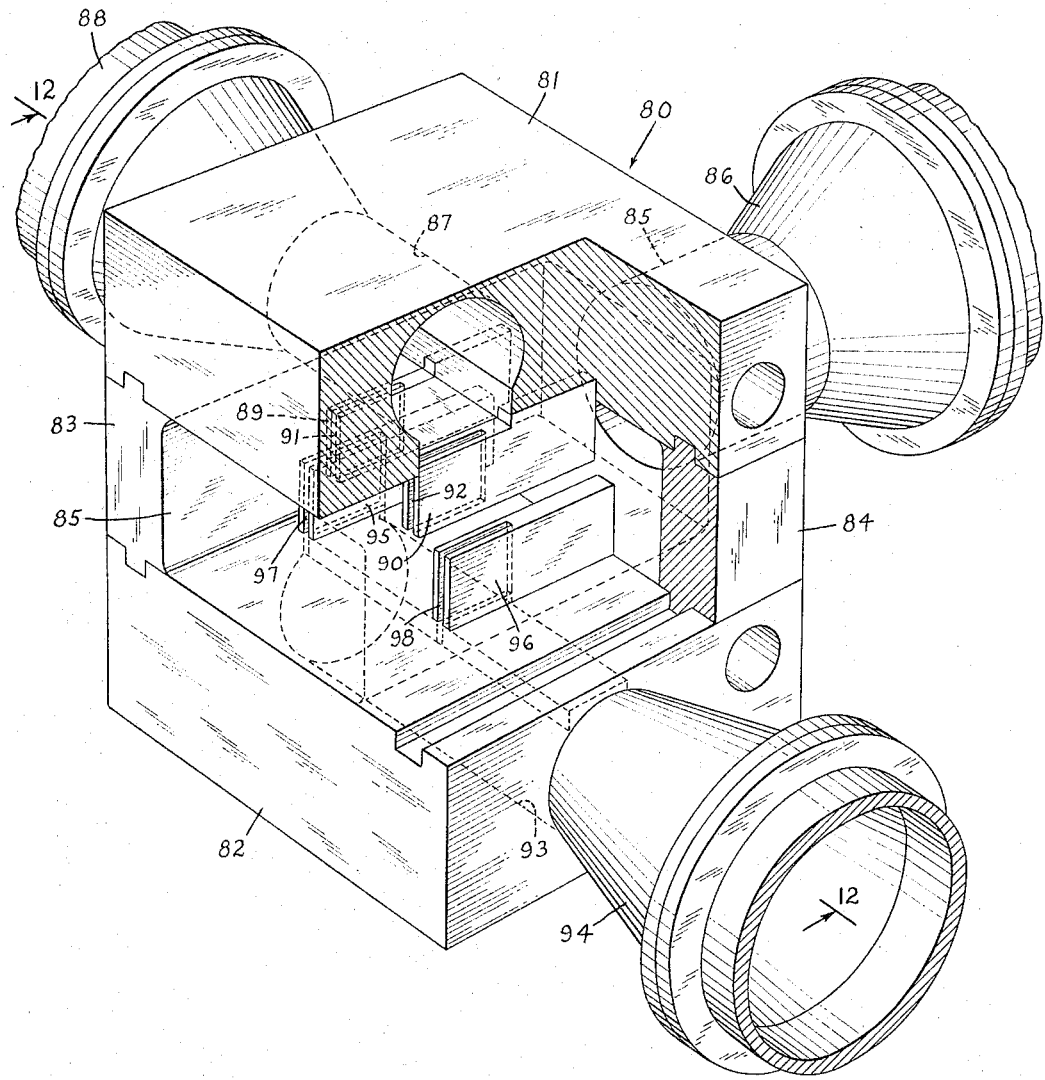

Aug. 30, 1966  W. A. KELLY ETAL  3,268,970
APPARATUS FOR MAKING MULTICOLORED SOAP BARS
Filed Nov. 27, 1964  6 Sheets-Sheet 6
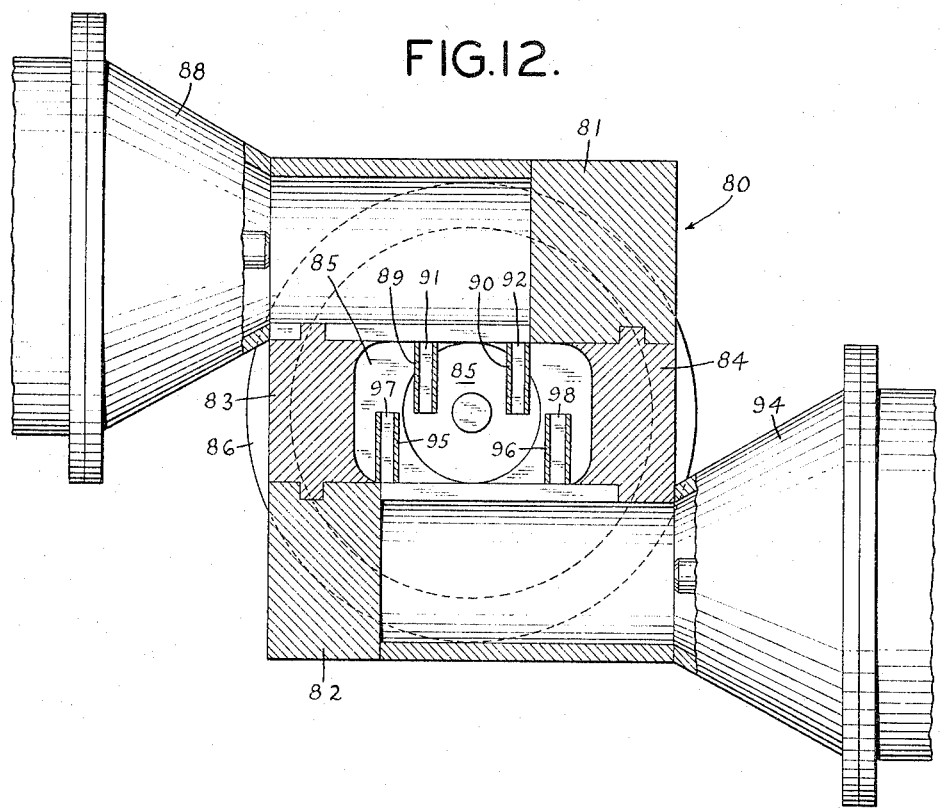
INVENTORS:
WILLIAM A. KELLY
PHILIP J. PETIX
BY
THEIR ATTORNEYS

United States Patent Office 3,268,970
Patented August 30, 1966

3,268,970
APPARATUS FOR MAKING MULTICOLORED SOAP BARS
William A. Kelly and Philip J. Petix, Teaneck, N.J., assignors to Lever Brothers Company, New York, N.Y., a corporation of Maine
Filed Nov. 27, 1964, Ser. No. 414,357
12 Claims. (Cl. 25—8)

This is a continuation-in-part of our copending application Serial No. 101,906, filed April 10, 1961 and now abandoned.

This invention relates to the manufacture of soap and detergent bars, and particularly to the manufacture of cakes of soap and detergents or the like having two or more sections of a different color, composition or both therein.

For convenience, reference is made particularly to soap bars in the following description. The principle of this invention is, however, generally applicable to bars of soaps, detergents (i.e. non-soaps) or mixtures of them. All or some portion of the bar may additiona'ly contain agents such as germicides, skin-softeners, dyes, perfumes, and other additives as are known in the art of manufacturing hand soaps. Accordingly, the word "soap" as used hereinafter and in the appended claims should be interpreted as including all such modifications within its scope.

Many attempts have been made to produce soap cakes having an ornamental design, indicia, or the like of a different color. None of these however, has been commercially successful. Among the manufacturing techniques proposed heretofore are those involved in the formation or punching of a hole or series of holes in a bar of soap and then inserting a preformed complementary insert of a material of a different color or kind into the punched hole or holes. Other processes involve the extrusion of a continuous rod or bar of soap in conventional, non-vacuum extrusion equipment, forming grooves or holes in it which extend lengthwise to the bar, and introducing into the holes or grooves, through a separate nozzle or nozzles, a soap or other plastic material of a different color or composition.

The principal difficulty with inserting separately-formed bodies into holes in soap cakes, or of laminating together separately formed layers of soap, is that the elements of the composite bar cannot be bonded together with sufficient permanence to prevent the resulting cake from delaminating or breaking up before it is consumed unless the elements are bonded together with special adhesives. Moreover, the cost of punching the holes in the soap cake for the insert bodies or layers, and inlaying the latter, is prohibitively expensive.

If the pattern is formed by extrusion, other difficulties arise. Of necessity, an extruded pattern is oriented axially of the extruded log. Since the patterns are generally in the form of concentric layers, the faces of soap cakes formed by cutting the extruded log must be transverse to the axes of extrusion for the patterns to be seen, as shown, for instance, in the patent to Garvey et al., No. 2,296,842. This results in a perpendicular orientation of the grain of the extruded cake, and tends to cause severe face cracking during the use of a cake.

In addition, separation of any design that might have been inserted may easily occur if distortion of the cake takes place during the stamping. With this type of extrusion, if cakes having rounded faces are desired, the design will be distorted during stamping unless special steps are taken. To avoid distortion of the design, the bars must be shaved to a rounded face curvature approximating the desired shape before stamping to avoid substantial flow of the soap during the stamping step. Shaving of the cakes will cause considerable scrap to be formed tending to make the process uneconomical.

Methods involving the simultaneous extrusion of materials to form composite, continuously extruded bars of soap are unsatisfactory for still another reason. If conventional extrusion equipment is employed in conjunction with dies adapted to extrude multi-sectional soap bars, erratic variation in the extrusion rates of the component sections relative to each other may be encountered. This induces a slippage between the extruded streams, as they merge together, which prevents them from thoroughly bonding to each other. Moreover, the shape of the pattern of inserted material will vary widely and unpredictably, producing a cake of undesirable appearance, and having relatively poorly bonded indicia therein.

In accordance with the present invention, an apparatus for the manufacture of a cake of a soap, a soap-non-soap, a non-soap detergent, or the like, is provided in which there are one or more sections of differing color or composition. By appropriately selecting the conditions under which two or more components of such a bar are simultaneously extruded, it is possible to obtain a bar in which the extruded components are firmly bonded together, and do not separate during the lifetime of the bar.

For a further understanding of this invention, reference may be had to the description below and to the accompanying figures in which:

FIGURE 6 is an over all schematic diagram of an apparatus for the practice of the invention;

FIGURE 7 is a sectional view of an extrusion die taken along line 7—7 of FIGURE 6;

FIGURE 8 is a partial sectional view taken along line 8—8 of the extrusion die of FIGURE 7;

FIGURE 9 shows a high pressure screw for use in the extruder shown in FIGURE 6;

FIGURE 10 is a diagram of typical operating curves of soap plodders;

FIGURE 11 is a perspective and partial sectional view of a die for making striped soap in accordance with the present invention; and FIGURE 12 is a partial sectional view taken along line 12—12 of FIGURE 11.

Figure 1:
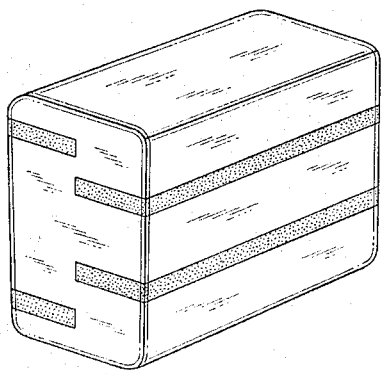
FIGURES 1 through 5 illustrate the various forms of composite soap bars which may be made through the practice of the present invention.
Figure 2:
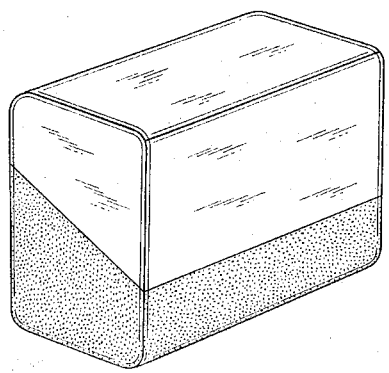
Figure 3:
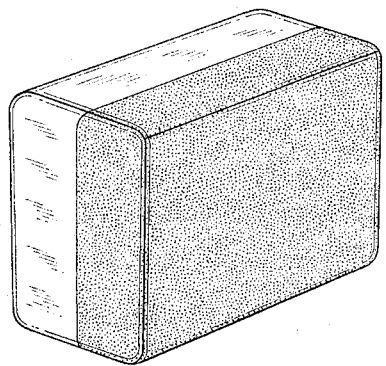
Figure 4:
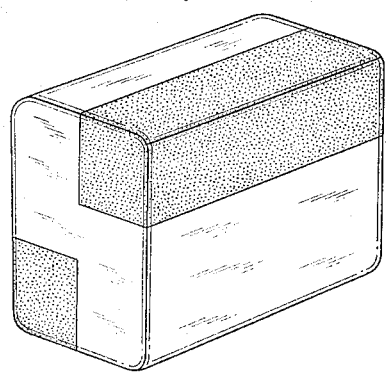
Figure 5:
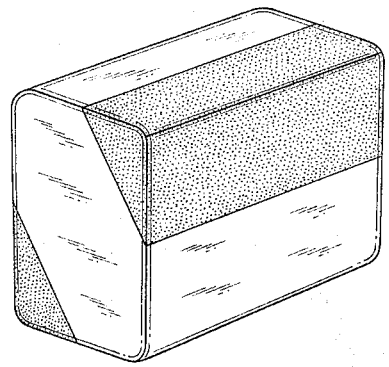

According to the present invention, the two or more streams of soap which are to be formed into a bar are plodded separately using vacuum plodders. In the practice of this invention, the use of vacuum plodding is of considerable importance. If conventional (atmospheric pressure) plodders are employed in the extrusion of multi-colored soap bars, the component sections of the bar do not bond permanently to each other. The reason for this is not fully understood. One explanation may be in the fact that the compacted soap contains occluded air.

Freshly milled soap chips such as are commonly employed in the manufacture of soap bars have a bulk density of approximately 0.5. As these chips are compacted into a bar in an ordinary plodder, the bulk density of the compacted soap will rise to a value slightly over 1. However, even the compacted bar will unavoidably contain some occluded air. A substantial portion of this occluded air can be avoided if a vacuum is applied to the loose soap as it advances into the compaction section of the plodder. Apparatus for this purpose is well known in the soap art as vacuum plodders.

In the extrusion of two-tone soap bars, it is believed to be important that the various sections, from which the composite bar is formed, are brought together before the surfaces thereof have come in contact with air. Possibly, the occluded air normally carried in compacted soap bars prepared by conventional atmospheric-pressure plodders, accumulates internally of the extrusion die employed to shape and to bring the component sections together and to weld them to each other. Such accumulated air could prevent various component sections of the completed bar from permanently bonding to each other.

Possibly, when a vacuum plodder is used the refined soap is deaerated enough to prevent the formation of deleterious accumulations of air within the extrusion die. In general, the vacuum required to achieve this result is approximately 15 inches of mercury. In the preferred embodiments, however, the vacuum should be no less than about 20 inches of mercury, and may be as high a vacuum as is obtainable with the equipment used.

The extruded soap from each plodder passes into the first portion of the main extrusion die, wherein the stream from each plodder is shaped in the desired proportion for each component section. These component sections are then brought into contact with each other in a second, converging portion of the main die. It is preferred that the soap streams have a temperature on their surface of at least 95° to 115° F. as they join together.

An important aspect of the present invention is the discovery that to obtain successful bonding the linear velocities of each of the component streams must be substantially the same when they join in the converging section of the die. As noted above, one of the deficiencies known in the prior art is that there are significant variations in the velocity of extrusion in conventional extrusion equipment which interfere with the bonding of the component streams as they are brought together.

After the component streams have been brought together within the main extrusion die, they are compressed into a unitary log. This is achieved in the final compression section of the die, wherein sufficient pressure is developed to cause adhesion and welding of the component sections to each other. Generally (but not necessarily), the requisite pressure may be conveniently achieved by reducing the cross-sectional area of the log within the compression section of the die by at least about 5% (based on the total of the initial cross-sectional area of the compression section).

The foregoing steps result in the extrusion from the nose of the extrusion die of a continuous log having a plurality of sections firmly bonded together, the grain of the sections being oriented parallel to the axis of the log. To transform the log into soap bars, the log is cut into appropriate lengths and, if desired, subjected to stamping or other finishing operations to provide a final shape, embossed insignia, or the like to the completed bar.

An important aspect of this invention is in cutting the log into lengths appropriate for soap bars, the bars are cut with their grain parallel to the face of the bar. This will normally mean that the smallest face (i.e. the end) of the finished bar will be perpendicular to the grain thereof, as well as to the weld joints between the component section.

As a practical matter, it is desirable that each of the component sections of the log has at least some portion exposed on the top or side faces of the soap bar. This is desirable from an aesthetic standpoint in order to obtain a maximum display of the varieties of colors which might be used. Also, from the standpoint of the use of the bar for washing purposes, this is desirable. An important advantage of this type of bar is that one or more sections may include germicides, emollients, and other components which are not necessarily compatible with the ingredients in the other component sections. In order that the component section carrying these special ingredients be washed uniformly, and thereby release the special ingredients uniformly during the life of the bar, the design of the component sections should be such as to provide exposure on the top or side face of the bar of the component sections carrying these special ingredients during the lifetime of the bar. This design will, of course, take into consideration not only the area of exposure at various percentages of consumption of the bar, but also, the differential, if any, in the ease with which the various different ingredients are dissolved during normal usage of the bar.

Aside from the foregoing considerations, however, the design of soap bars embodying this invention may encompass many possibilities. For instance, the soap bar may be designed with a plurality of staggered stripes running through each face of the bar, as shown in FIGURE 1, and as described in more detail in our copending application Serial No. 101,906 mentioned above. Many other patterns are conceivable, such as the division of the soap bar into horizontal or vertical bands, or into quadrants, or diagonal sections, all of which exemplary configurations are illustrated in FIGURES 2–5.

FIGURES 6–9 schematically disclose an apparatus suitable for carrying out the process of the present invention. In FIGURES 6–9, the apparatus illustrated is particularly adapted for making a soap bar having two sections to it, although it will be understood that this is purely illustrative. As shown in FIGURE 6, the apparatus comprises two vacuum plodders 22 and 24 arranged around the extrusion die 26. Each of the vacuum plodders is substantially identical, and in the description hereinafter the identical parts in each of the vacuum plodders 22 and 24 are identically numbered.

Each vacuum plodder is provided with a feed hopper 28 to receive milled soap chips, and the like. The soap chips are then advanced by a refiner screw 30, and passed through a refining plate 32 into vacuum chamber 34. The refiner screw 30 and refining plate 32 compact the soap chips sufficiently that the vacuum chamber 34 is effectively sealed from the atmosphere. As the compacted chips pass through the refining plate 32 they are converted into spaghetti-like strands which fall to the bottom of vacuum chamber 34.

The vacuum in chamber 34 is maintained by an appropriate vacuum pump (not shown) connected to chamber 34 by pipe 36.

In the lower portion of vacuum chamber 34 is located a compression screw 37. The compression screw 37 should be capable of advancing the soap through the plodder nose cone 38, and thence through the extrusion die 26 at a substantially constant rate. For this reason, compression screw 37 is preferably of the type referred to hereinafter as a "high pressure screw" which is illustrated in detail in FIGURE 9, and is described more completely below.

As shown in more detail in FIGURES 7 and 8, the extrusion die employed in the practice of the present invention comprises a plurality of passages. Conveniently, this die may be considered as being composed of three sections. The first section, comprising passages 40a and 40b up to areas $A_1$ and $A_2$ receives the soap streams from the several plodders and shape these component sections into appropriate sizes and shapes to be joined into the multicolored soap bar. The second major portion of the extrusion die is tapered passage 46 from areas $A_1$ and $A_2$ to area C. Within passage 46 the shaped component sections of the soap bar are brought into contact with each other. The third and final section of the extrusion die is passage 48, provided to compress the component sections together and to weld them into a unitary log which leaves the open end 50 of the die.

The design of the shaping passages 40a and 40b may follow practices more or less conventional in the art of extruding soap bars. In a conventional screw (not shown in the figures) the die for shaping the extruded soap to the final shape is usually a simple sharp-edge orifice mounted across the face of flange 39 on the nose cone 38. In principle, such a sharp-edge orifice is all that is required in the present apparatus for the purpose of shaping the component portions of the two-tone bar.

As a practical matter, however, it is inconvenient to locate such sharp-edge orifices in the close proximity to each other which is required for bringing the component sections together without permitting the freshly-formed surfaces to come into contact with air. For this reason, extended passages 40a and 40b are provided to conduct the extruded soap from the passages 40 in the nose cones 38 of the plodders into close proximity to each other and simultaneously to shape the soap bars to the desired shape.

The open area of the nose cone at flange 39 is necessarily larger than the areas $A_1$ and $A_2$ at the end of passages 40a and 40b, in order that these passages will be able to perform the desired shaping function. The compression of the soap passing through passages 40a and 40b, together with the compression provided by the tapered passage 40 of the nose cone 38 of the plodder should be sufficient to provide the back pressure necessary to compact the soap being extruded. For this reason, area $A_1$, the smallest area of the combined passages 40–40a (or area $A_2$ of passages 40–40b) will normally be less than about 25% of the cross-sectional area of the plodder screw. Because of the commercially available sizes of compression screws (normally 6"–12" in diameter) in relation to the commercial sizes of soap bars (normally 1"–2" in size), the areas $A_1$ and $A_2$ at the end of passages 40a and 40b will usually be less than about 10% of the screw area.

As mentioned, the next important section of the extrusion die is the converging section 46. The purpose of the sharply converging passage 46 is to receive the component streams of soap from passages 40a and 40b and to bring the streams rapidly into contact with each other. Accordingly, the area relationships within this section of the extrusion die are of importance. The area C at the termination of converging section 46 should be no greater than the sum of areas $A_1$ and $A_2$ of the component streams entering converging section 46. Preferably, area C should be smaller than the sum of areas $A_1$ and $A_2$ by perhaps 2% to 5%. This will insure that the component streams are brought firmly into contact with each other.

As has been mentioned, it is desirable that the soap streams as they contact each other should have a surface temperature of about 95°–115° F. For this purpose, a heating blade 44 may be provided on the trailing edge of divider 42. If the heating blade 44 extends into converging section 46, the minimum cross-sectional area of the converging soap streams may be areas $B_1$ and $B_2$ rather than areas $A_1$ and $A_2$. If this is the case, then area C at the termination of tapering section 46 should be no greater than about the combined areas $B_1$ and $B_2$ (rather than areas $A_1$ and $A_2$).

The final section of the extrusion die is the compression section 48. This section receives the joined component streams from the tapering section 46 and compresses them sufficiently to bond or to weld them into a unitary log. For this purpose, section 48 must provide sufficient pressure at area C to cause the component sections to weld to each other. This pressure may be provided by a straight passage of sufficient length. However, it is considered better practice to make area D somewhat smaller than area C to insure that there will be satisfactory bonding within passage 48. The area reduction may be in the range of 5% to 40%. Preferably, however, radical area changes within section 48 should be avoided because this will cause a disruption of the flow pattern within the die and also may tend to cause tearing of the surface of the extruded soap bar. It has been found that good results can be obtained in a die where the area D (at the outlet of the extrusion die) is about 5%–15% smaller than area C. In this preferred embodiment, the taper of the die passage 48 is approximately 1° to 2°.

As may be seen from FIGURES 7 and 8, the tapers of the passages 40a, 40b, 46 and 48 in the horizontal and vertical directions need not be the same. As shown in FIGURE 8, for instance, the horizontal boundaries 49 of the die may be uniformly spaced apart throughout, this arrangement simplifying the manufacture of a die such as shown in FIGURES 7 and 8.

While the extrusion die shown in FIGURES 6 to 8 is generally satisfactory for the practice of the present invention, certain modifications are possible and may provide improved results. One such modification (not shown) is to provide divider 42 or heating blade 44 with a serrated or zig-zag trailing edge. This is advantageous to provide additional surface areas for bonding, thereby to decrease the possibility that the component sections of the completed soap bar are separate under subsequent use conditions.

As mentioned above, an important aspect of the present invention is that the streams of warm plastic soap emerging from passage 40a and 40b must be at a substantially uniform velocity. To achieve this result, high pressure screws are employed in the plodders. Screws capable of developing higher than normal pressures are necessary because the extrusion die described above will offer more resistance to the flow of soap than a conventional die. The pressure resistance of a conventional die orifice across the face of flange 39, taken together with the resistance of passage 40, is obviously that needed to compact and to form the soap into a bar. This is the same as the resistance offered by passages 40a and 40b which, as mentioned above, compact and shape the several component streams. Additional resistance in the die of the present invention is necessary to bring the various streams together (passage 46) and to weld them into a unitary log (passage 48).

As is well known, the output pressure which can be developed by an extrusion screw is a function of a number of factors. One of the most important factors is the flight depth of the screw. Screw plodders conventionally employed in the soap art have relatively deep flight depths. The ratio of flight depth to screw diameter will typically be in the order of 0.3. Because of the deep flight depth of the conventional screw, it is capable of developing only relatively low extrusion pressure, i.e. in the order of about 200 to 500 lbs. These pressures are normally quite adequate for a conventional plodder having a sharp-edge die. However, they are only of marginal adequacy for the extrusion two two-tone soap bars when employing the die described in FIGURES 7 and 8 because of the significantly higher pressure drop of that die.

As a consequence, even slight temporary blockages within the extrusion screw may stop the flow of soap altogether. The screw will continue to churn the soap, thereby increasing its temperature and melting the soap sufficiently to eliminate the blockage. When this happens, however, a large quantity of excessively softened soap will suddenly spurt out through the die thereby upsetting the balance of flow through the die and lead to misshapen and poorly bonded bars.

To overcome this problem, it has been found that the above-described two-tone extrusion die should be used in conjunction with a high pressure screw. To achieve the desired high extrusion pressures, a screw having a shallow flight depth will be employed. Typically, the ratio of flight depth to screw diameter will be in the order of less than 0.15. A screw in which the flight depth to pitch diameter ratio is slightly less than 0.1 has been found to be particularly suitable for this purpose. Such a screw is illustrated in FIGURE 9.

As shown in FIGURE 9, soap is received by the extrusion screw 37 within vacuum chamber 34 described above. The portion 64 of screw 37 extending across the vacuum chamber 34 is of relatively deep flight depth, for instance, the flight depth being approximately ¼ of the screw diameter. This deep-flighted portion of the screw 37 receives the refined soap from the vacuum chamber and transfers it into the compression section 66 of screw 37 which is enclosed by a casing 68. The compression section 66 has a shallow flight depth which, as mentioned, will normally be less than about 15% of the screw diameter.

The distinction between the operation of a deep flighted screw such as conventionally used for soap plodding and a shallow flighted, high pressure screw, such as employed in the present invention, is seen by a comparison of typical curves of extrusion rate as a function of the speed of rotation of the screw. Typical such curves are shown in FIGURE 10 for the case where the screws are employed to extrude soap through a die having a high pressure drop such as would be employed for extruding a two-tone soap bar. At very low extrusion rates, a deep-flighted screw (curve A) will show a more or less linear rise of extrusion rate with an increase in the speed of rotation at low speeds, but, at some point, it would be found that further increases in the speed of rotation will produce no additional increase in extrusion rate. It is at this point that the screw has developed the maximum possible pressure of which it is capable.

Theoretically, so long as the screw continues to extrude the soap at a maximum, constant pressure, the flow rate of the soap through the die, also having an invariant pressure drop, will remain unchanged. As a practical matter, however, the churning of the soap by the extrusion screw under these conditions tends to melt the soap sufficiently to result in the erratic extrusion rates which were mentioned above.

A high pressure screw such as described above, will exhibit the same linear relationship between screw rate and speed of rotation at low extrusion rates as exhibited by a low pressure screw (see curve B). However, because the high pressure screw is capable of developing sufficient pressure to overcome the resistance of the two-tone die, the screw will continue to provide an increasing output as the speed of rotation is increased. Accordingly, at practical extrusion rates, the high pressure die does not exhibit the erratic behavior encountered when conventional soap plodding screws are employed with the two-tone die.

As is well known, for satisfactory operation of an extrusion screw and die system, the extrusion screw must be so designed as to provide an output pressure appropriate to the requirements of the extrusion die. As noted above, a high pressure screw is required for the satisfactory operation of the two-tone extrusion die. For the purpose of this invention, a high pressure screw may be considered to be a screw which will operate in the linear portion of the extrusion rate vs. speed of rotation curve at the extrusion rates to be employed. By the linear portion of the extrusion rate curve, reference is made to that portion of the curve originating at or about the origin and rising in a more or less straight line therefrom, and is distinguished from that portion of the curve at high rotational speeds wherein the extrusion rate is substantially unaffected by increases in the speed of rotation of the screw.

As mentioned above, a variety of designs may be extruded with the apparatus of the present invention, such designs being illustrated in FIGURES 1 through 5.

In one particular embodiment, which is disclosed in our copending application Serial No. 101,906, the soap or non-soap bar is characterized by a plurality of stripes extending inwardly from each face to approximately the mid-plane of the cake. The stripes from opposite sides of the cake are set apart laterally from each other in an amount of at least ⅛ inch. Inasmuch as each stripe extends half-way through the cake, the stripes will be present until the cake is completely used. By off-setting the stripes from the opposite sides with respect to each other, a strong skeleton or core is provided which further improves the resistance to breaking and delaminating along the boundaries of the stripes.

An apparatus particularly appropriate for this embodiment is shown in FIGURES 11 and 12. These figures disclose schematically a die member 80 composed of a pair of upper and lower plates 81 and 82 having spacer members 83 and 84 between their lateral edges to provide a die passage 85 through which soap is forced to form a continuous elongated rod. Plastic soap is supplied to one end of the die passage 85 by means of a screw conveying device, such as a screw plodder 86 (not shown), which forces the soap under pressure through the die passage 85.

The upper plate 81 is provided with a transverse blind bore 87 which is connected with a screw conveying device such as a screw-type plodder 88 (not shown) and also carries a pair of flanges 89 and 90 which extend downwardly into the die passage 85 to its mid-plane. Each of the flanges 89 and 90 has a closed or solid leading edge portion facing upstream with respect to the flow of soap at the inlet end of the die passage 85 and a slotted trailing edge spaced inwardly from the discharge end of the passage and facing downstream. The slots 91 and 92 extend the full height of the flanges 89 and 90, respectively, into communication with the bore 87 and are open at the bottom and trailing edges of the flanges.

Similarly, the lower plate 82 is provided with a blind bore 93 which communicates with a screw conveying device such as the screw type plodder 94. If the material supplied to the bores 87 and 93 is the same, they may be connected to a single plodder. Flanges 95 and 96 are similar to the flanges 89 and 90 and have slots 97 and 98 therein communicating with the bore 93 extending upwardly into the passage 85 and have their upper ends in about the same plane as the lower ends of the flanges 89 and 90, i.e., in about the mid-plane of the die passage 85.

In operation, plodder 86 supplies plastic soap to the die passage and the soap flows through the passage 85 and is discharged therefrom in the form of an essentially continuous rod of uniform cross-section. As the soap flows around the flanges 89, 90, 95 and 96, they form grooves of uniform depth and width in the soap rod. Simultaneously, different soap material is forced into the bores 87 and 93 by means of plodders 88 and 94, and flows through the slots 91 and 92, 97 and 98 into the grooves in the advancing rod of soap. The material supplied by the plodder 88 may be the same as, or different from, the material supplied by the plodder 94. Inasmuch as each slot 91, 92, 97 and 98 extends from the bottom to the top of its respective flange, the different soap material completely fills the grooves. The die passage 85 extends beyond the trailing edges of the flanges 89, 90, 95 and 96 to form a compacting zone. The spacers 83 and 84, the plates 81 and 82, or both, may be slightly tapered in the compacting zone downstream of the flanges to form a constriction in the compacting zone.

As the striped soap rod issues from the die passage 85, it may be received on a conveyor (not shown) and carried to a cutter where it is cut into cakes of a desired size and molded or shaped to form cakes like that shown in FIGURE 1 or any other desired shape. Alternatively, the rod may be cut into cakes as it leaves the passage 85 and the sections carried to a molding apparatus for molding into cakes.

The dies shown in FIGURES 7, 8, 11 and 12 are schematically illustrated. In an actual apparatus, the die may take other forms and may be constructed in other ways. For example, the die may be a unitary casting having suitable couplings for connecting the bores and passages therein through the plodders. The passages 40a and 40b (in FIGURES 7 and 8), and the bores 88 and 93 (in FIGURES 11 and 12), may extend lengthwise in parallel, or substantially parallel, relation to the axis of the extrusion die.

Other changes may be made in the apparatus, as may be required for producing soap cakes of various sizes, by varying the number and size of the component sections or stripes to be formed in the cake, and the orientation of the component sections and/or stripes with respect to the cake.

The apparatus illustrated renders the grain of the component sections of the soap bar substantially parallel to its longitudinal axis, thereby improving the bonding of the component elements, and minimizing face cracking during use.

The following examples further illustrate the process of the present invention in typical products.

*Example 1*

A white sodium soap comprised of a base stock of 80% tallow, 20% coconut oil and containing about 15% moisture was milled and worked prior to extrusion in a vacuum plodder and used for the main body of a striped bar as illustrated in FIGURE 1. Soap having the same moisture content and to which was added a germicide (3,4′,5-tribromosalicylanilide) and a pink dye was worked in a similar manner. The white soap was extruded through a die like that shown in FIGURES 11 and 12, except that a single injecting flange on one side and a double flange on the other were used. A single plodder was used to inject the colored soap into the grooves on both sides of this rod. The extruder for the main body was started first and then the extruder for the striping insert was started. The speed of the striping plodder was adjusted to fill the grooves completely. Once this adjustment was made, a continuous rod of striped soap came out the end of the extrusion die with no appreciable variation in the appearance of the stripes. The rod was cut into blanks and the blanks were stamped into finished cakes on a typical soap-stamping press. The stripes accounted for approximately 10% by weight of the cake.

The cakes were tested for germicidal activity and were equivalent to cakes in which the same total quantity of germicide was added to the entire cake.

Similar all-soap cakes containing no germicide, but with different colored stripes, were made. These included stripes of different width on each face of the cake, and different numbers of stripes, up to a total of eight stripes, four on each side. Cakes were also made in which the main body was colored and the stripes were white.

*Example 2*

Cakes were made using the method described above in which the main body of the cake was soap and the stripes were composed of a soap-non-soap mixture containing 18% tallow Igepon T (i.e., sodium tallow fatty acid methyl taurate), 6% free stearic acid, 6% water, and the balance tallow and coconut soaps.

Other cakes were made in which both the main body and the stripes were composed of a soap-non-soap having the same composition as that described above, the stripes being differentiated by color.

*Example 3*

Cakes were made, as above, in which both the main body and the stripes were composed of a detergent-type material as described in Patent No. 2,894,912. This material contains about 50% coconut Igepon A (i.e., the ester of sodium isethionate and coconut oil fatty acids), 9% soap, 27% stearic acid, 2% sodium dodecylbenzene sulphonate, 4% water, and 8% miscellaneous salts.

*Example 4*

A quantity of a white sodium soap of the type described in Example 1 was divided into two portions, and one portion colored by the addition of a dye. Milled chips of the undyed (white) portion were added to plodder 22 (of FIGURE 6) while milled chips of the colored portion were added to plodder 24. Using the apparatus as described in FIGURES 6–9, a soap bar having one side white and the other side colored was extruded. The extruded rods were cut into blanks, and the blanks were stamped to finished bars on a Jones soap stamping press.

*Example 5*

Using different materials, a bar of soap was made following generally the procedure outlined in Example 4. Half of the body of the bar was soap and the other half was composed of a soap-non-soap mixture. The soap-non-soap half contained 18% tallow Igepon T, 6% free stearic acid, about 6% water, and the balance tallow and coconut soaps.

A bar prepared in accordance with Example 5 was treated in the following manner: the bar was first washed for approximately 45 seconds in 100° F. running tap water and thereafter was allowed to dry for approximately one day. On the following four consecutive days, the soap bar was subjected to three periods of washing for 30 seconds in running tap water at 75° F., and after each third washing, the bar was allowed to air-dry overnight. On the sixth day, the bar was examined for separation. No separation was observed at the joint.

Example 5 was repeated, and the soap bars obtained were tested in the manner as described above. During this experiment, the divider between the two components of the soap entering the extrusion dye was heated. Only very slight separation of the joint was observed.

Example 5 was repeated again, this time employing a saw-tooth divider between the two component sections. When a cold saw-tooth divider was used, no separation at the joint was observed. If a hot saw-tooth divider was used, very slight separation of the joint was observed.

In none of the above cases did the bars fall apart; the separation referred to shows up only as a very thin line observed along the joint.

Inasmuch as the apparatus and the resulting product are susceptible to considerable variation as indicated above, the forms of the invention disclosed herein should be considered as illustrative only and not as limiting the scope of the following claims.

We claim:

1. Apparatus for making striped soap comprising a die member having a die passage therein corresponding in cross-section substantially to the cross-section of a finished soap bar, a screw conveying device for supplying plastic soap to one end of said die passage for flow therethrough, at least one flange extending into said die passage from one side thereof and having an inner edge disposed in about the mid-plane of said die passage to form a groove in the soap flowing through said passage, said flange having a closed leading end facing toward said conveying device and a trailing end having a slot extending throughout the height of the flange and through the trailing end and the inner edge thereof and a screw conveying device for supplying plastic different soap material to said slot for flow therethrough into said groove to fill it completely.

2. The apparatus set forth in claim 1, comprising means forming a constriction in the die passage downstream of said trailing end of said flange to bond the different soap material to said soap.

3. Apparatus for making striped soap according to claim 1 having flanges spaced apart transversely of said die passage and extending into it from opposite sides, and having inner edges disposed in about the mid-plane of said die passage to form grooves in the soap flowing through said passage, each flange having a closed leading end facing toward said device and a trailing end having a slot extending throughout the height of the flange and through the trailing end and the inner edge thereof and screw conveying devices for supplying plastic different soap material to said slots for flow therethrough into said grooves to fill them completely.

4. Apparatus for making striped soap comprising a die member having a die passage therein corresponding in cross-section substantially to the cross-section of a finished soap bar, a screw conveying device for supplying plastic soap to one end of said passage for flow therethrough, flanges on said die member extending into said die passage from opposite sides thereof to form grooves in the soap flowing through said passage, each flange having an inner edge in about the mid-plane of said passage and extending lengthwise of said passage, said flanges being in offset relation to each other transversely of said passage, each flange having a leading end facing upstream with respect to the flow of said soap and a trailing end facing downstream, said trailing end having a slot therein facing downstream and extending through said inner edge the full depth of the respective edge and said trailing end, and screw conveying devices for supplying different soap material to said slots for flow therethrough into said grooves to fill them from top to bottom and side to side.

5. The apparatus set forth in claim 4 comprising means forming a constriction in said die passage downstream of the trailing ends of said flanges to bond the different soap material in said grooves to the soap.

6. Apparatus for making striped soap comprising a die member having a die passage therein corresponding in cross-section substantially to the cross-section of a finished soap bar, a screw conveying device for supplying plastic soap to one end of said passage for flow therethrough, pairs of flanges on said die member extending into said die passage from opposite sides thereof to form grooves in the soap flowing through said passage, each flange having an inner edge in about the mid-plane of said passage and extending lengthwise of said passage, said flanges being in offset relation to each other transversely of said passage, each flange having a leading end facing upstream with respect to the flow of said soap and a trailing end facing downstream, said trailing end having a slot therein facing downstream and extending through said inner edge the full depth of the respective edge and said trailing end, and screw conveying devices for supplying different soap material to said slots for flow therethrough into said grooves to fill them from top to bottom and side to side.

7. In an apparatus for forming soap bars comprising at least two component sections bonded together, an extrusion die for forming a log of soap and at least two vacuum plodders connected with said die for supplying at least two streams of soap thereto, said plodders each comprising:

(a) a chamber for accumulating a supply of the refined soap, (b) a first means for maintaining a vacuum in said chamber, (c) a second means connected to said chamber for supplying the refined soap thereto and means sealing said chamber from a loss of vacuum, and (d) a connection between said chamber and said die for transferring refined soap therebetween having a substantially cylindrical passage therethrough, a high pressure screw plodder in said passage, having a ratio of pitch depth to diameter of less than about 0.15, which extends into the supply of refined soap in said chamber, and means for rotating said high pressure screw plodder in a direction adapted to cause said plodder to transfer refined soap from said chamber to said die at a substantially constant rate;

and said extrusion die having at least two entry passages, a mid-portion and a compression section, in which:

(e) each entry passage comprises means associated with one of said connections for receiving a plastic soap stream therefrom and a discharge end which has an opening substantially in the shape of a component section of said soap bar, said opening having a cross-sectional area which is less than about 25% of the cross-sectional area of the plodder screw associated with said entry passage, whereby said entry passages are adapted to compact the soap streams received from said connections and to shape said streams into component sections, said entry passages further being so disposed relative to each other that said discharge ends thereof are adapted to discharge the component sections therefrom as parallelly moving immediately adjacent sections, (f) the mid-portion of said die comprising receiving means joined to the discharge ends of said entry passages for receiving the parallelly moving, immediately adjacent component sections, said receiving means preventing air from contacting the surfaces of the freshly extruded component sections, said mid-portion further comprising means for convergingly forcing said component sections into engagement with each other thereby forming a soap log, and means forming an outlet for said soap log, the area of said outlet means being less than the sum of the areas of the openings of the discharge ends of said entry passages, and (g) said compression section comprising means attached to the outlet means of said mid-portion for receiving the soap log therefrom, and means for developing sufficient frictional resistance to the passage of said soap log therethrough to develop a bonding pressure which welds said compression sections together.

8. An apparatus according to claim 7 wherein the area of the opening in the discharge end of said entry passages is less than about 10% of the cross-sectional area of the corresponding plodder screw.

9. An apparatus according to claim 7 wherein the area of the outlet means of said mid-portion is between about 2% and about 5% smaller than the sum of the areas of the openings of the discharge ends of said entry passages.

10. An apparatus according to claim 7 wherein the means of said compression section for developing frictional resistance to the flow of said soap log includes means forming a converging passage whose cross-sectional area at the outlet thereof is between about 5% and about 15% less than the area of the outlet means of said mid-portion.

11. An apparatus according to claim 7 wherein the discharge ends of said entry passages have trailing edges which are provided with elements for heating the surfaces of the soap stream passing through said die.

12. The apparatus as set forth in claim 1 wherein said screw conveying devices are vacuum plodders to exclude air from between said soap and said different soap material.

References Cited by the Examiner

UNITED STATES PATENTS

| | | | |
|---|---|---|---|
| 484,777 | 10/1892 | Chase | 25—8 |
| 720,535 | 2/1903 | Schwechler | 25—8 |
| 2,011,160 | 8/1935 | Plepp. | |
| 2,146,770 | 2/1939 | Schwantes | 252—367 |
| 2,213,772 | 9/1940 | Strain | 252—367 |
| 2,249,311 | 7/1941 | Johnston et al. | 18—13 |
| 2,296,842 | 9/1942 | Garvey et al. | 25—8 |
| 2,642,643 | 6/1953 | Montaque | 18—12 X |
| 2,649,417 | 8/1953 | Compa | 252—367 X |
| 2,713,188 | 7/1955 | Garvey | 18—12 |
| 2,761,418 | 9/1956 | Russell | 18—13 |
| 3,040,005 | 6/1962 | Bernhardt et al. | 18—12 X |
| 3,150,214 | 9/1964 | Scalora et al. | 18—12 X |
| 3,156,009 | 11/1964 | Alsys | 18—12 |

FOREIGN PATENTS 374,147   6/1932   Great Britain.

WILLIAM J. STEPHENSON, *Primary Examiner.*

L. S. SQUIRES, *Assistant Examiner.*